(12) United States Patent
Mark

(10) Patent No.: US 10,589,352 B2
(45) Date of Patent: Mar. 17, 2020

(54) MOLTEN METAL JETTING FOR ADDITIVE MANUFACTURING

(71) Applicant: MARKFORGED, INC., Watertown, MA (US)

(72) Inventor: Gregory Thomas Mark, Brookline, MA (US)

(73) Assignee: MARKFORGED, INC., Watertown, MA (US)

( * ) Notice: Subject to any disclaimer, the term of this patent is extended or adjusted under 35 U.S.C. 154(b) by 0 days.

(21) Appl. No.: 16/427,448

(22) Filed: May 31, 2019

(65) Prior Publication Data

US 2019/0375003 A1 Dec. 12, 2019

Related U.S. Application Data

(63) Continuation of application No. 15/275,849, filed on Sep. 26, 2016, now Pat. No. 10,315,247.

(60) Provisional application No. 62/232,352, filed on Sep. 24, 2015.

(51) Int. Cl.
| | |
|---|---|
| *B33Y 30/00* | (2015.01) |
| *B22D 31/00* | (2006.01) |
| *B22D 11/01* | (2006.01) |
| *B22D 27/00* | (2006.01) |
| *B33Y 10/00* | (2015.01) |
| *B22F 3/105* | (2006.01) |

(52) U.S. Cl.
CPC ............ *B22D 31/002* (2013.01); *B22D 11/01* (2013.01); *B22D 27/003* (2013.01); *B22F 3/1055* (2013.01); *B33Y 10/00* (2014.12); *B33Y 30/00* (2014.12); *B22F 2998/10* (2013.01); *B22F 2999/00* (2013.01); *Y02P 10/295* (2015.11)

(58) Field of Classification Search
CPC ......... B33Y 10/00; B33Y 30/00; B33Y 40/00; B33Y 50/02; B33Y 70/00; B33Y 80/00; B23K 26/342; B23K 26/034
See application file for complete search history.

(56) References Cited

U.S. PATENT DOCUMENTS

| | | | |
|---|---|---|---|
| 5,257,657 | A | 11/1993 | Gore |
| 5,286,573 | A | 2/1994 | Prinz et al. |
| 5,337,961 | A | 8/1994 | Brambani et al. |
| 5,598,200 | A | 1/1997 | Gore |
| 5,906,863 | A | 5/1999 | Lombardi et al. |
| 6,202,734 | B1 | 3/2001 | Sackinger et al. |
| 8,523,331 | B2 | 9/2013 | Houben |
| 8,721,032 | B2 | 5/2014 | Kuznetsov et al. |
| 9,149,988 | B2 | 10/2015 | Mark et al. |
| 9,370,896 | B2 | 6/2016 | Mark |
| 2014/0034626 | A1* | 2/2014 | Illston .................. B22F 3/1055 219/121.78 |
| 2014/0265049 | A1* | 9/2014 | Burris .................. B23K 26/034 264/497 |

(Continued)

FOREIGN PATENT DOCUMENTS

WO 2009009137 A1 1/2009

*Primary Examiner* — Erin B Saad
(74) *Attorney, Agent, or Firm* — Lando & Anastasi, LLP

(57) ABSTRACT

In molten metal jetting, where droplets of metal are jetted to 3D print a part, each layer may be traversed each successive layer with a normalizing grinding wheel or other leveling device such as a layer to level each successive layer, and/or the melt reservoir or printing chamber may be filled with an anoxic gas mix to prevent oxidation.

34 Claims, 14 Drawing Sheets

(56) References Cited

U.S. PATENT DOCUMENTS

2014/0291886 A1* 10/2014 Mark .................. B29C 70/384
264/163
2015/0273577 A1 10/2015 Vader et al.

* cited by examiner

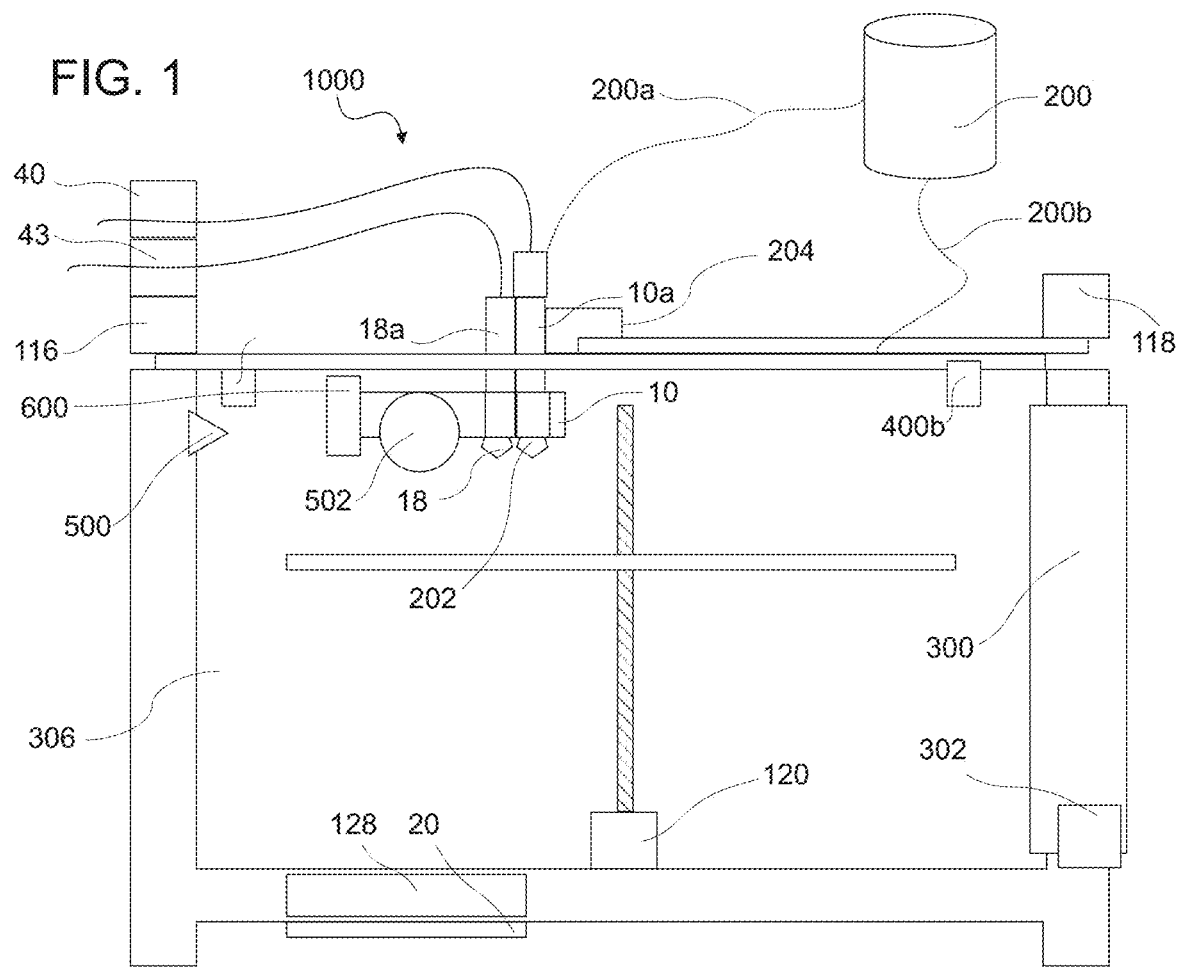

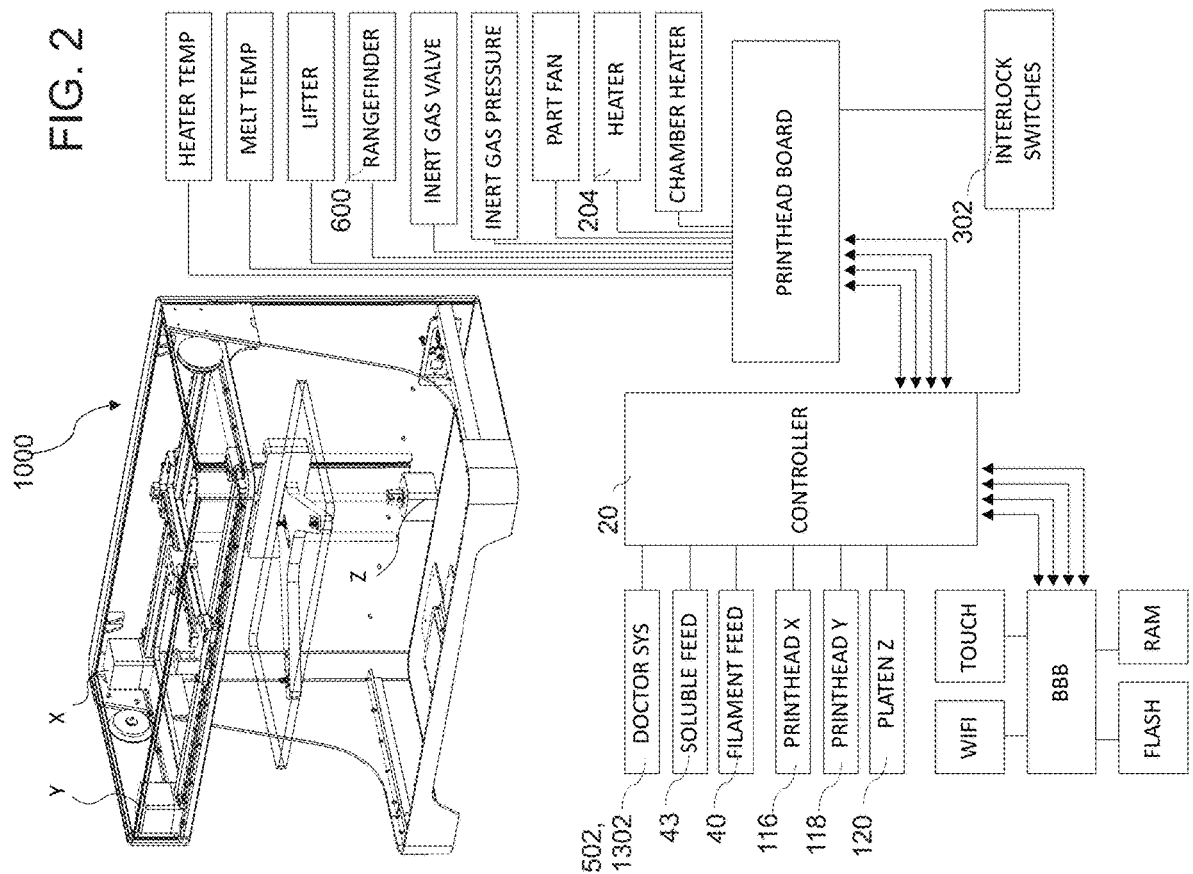

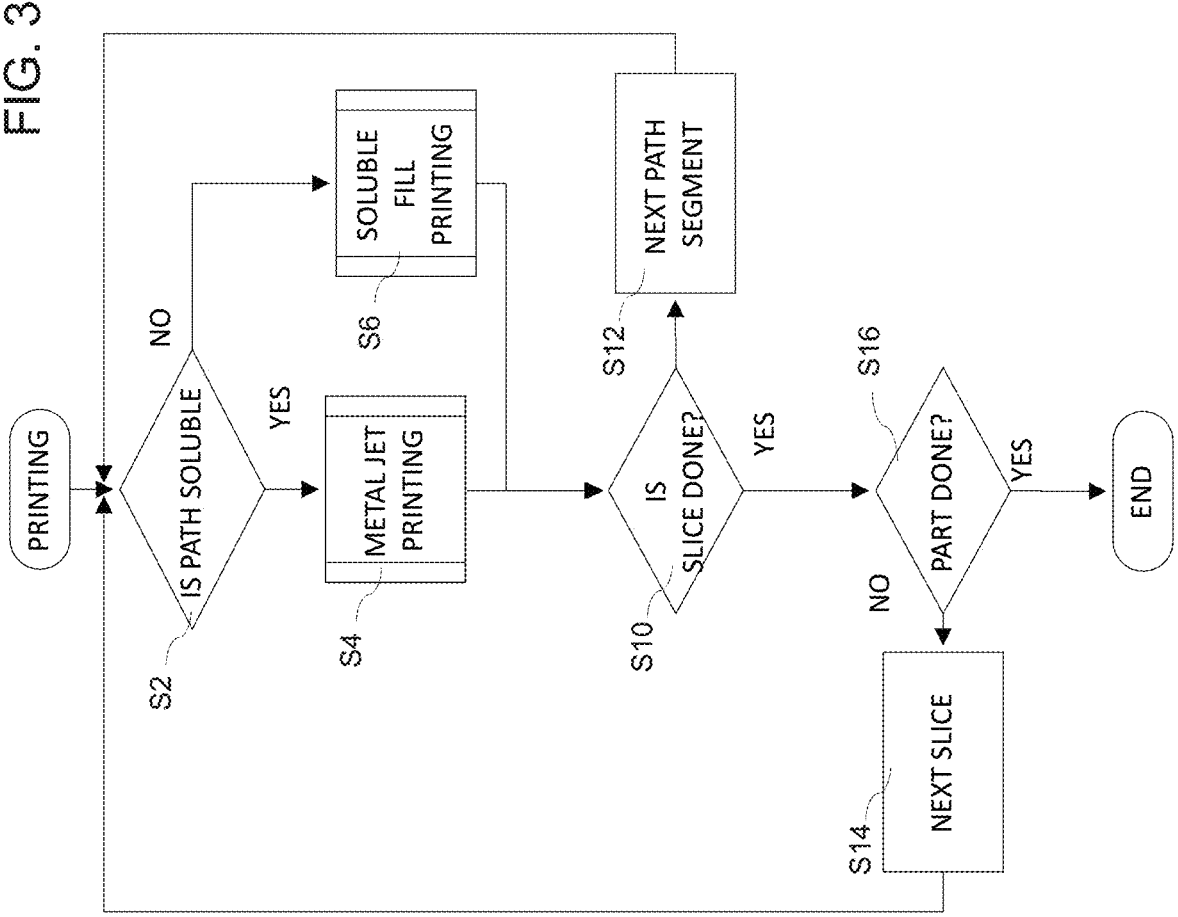

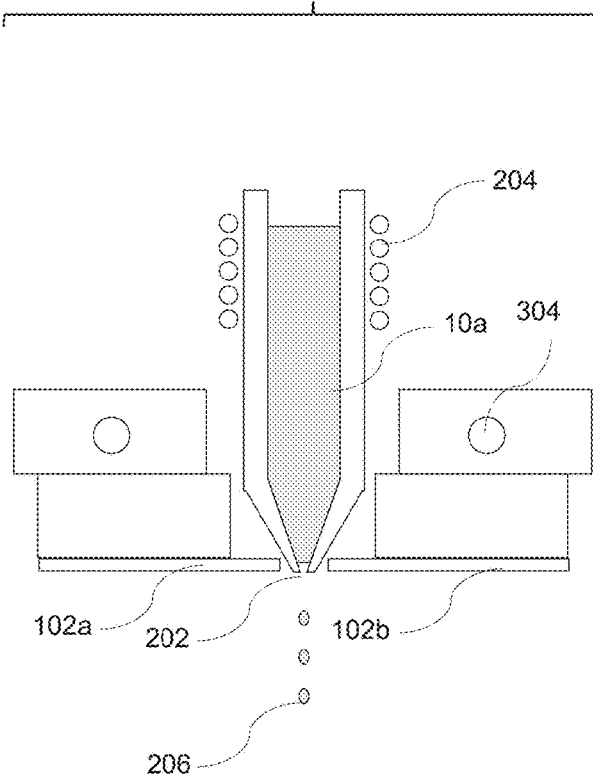
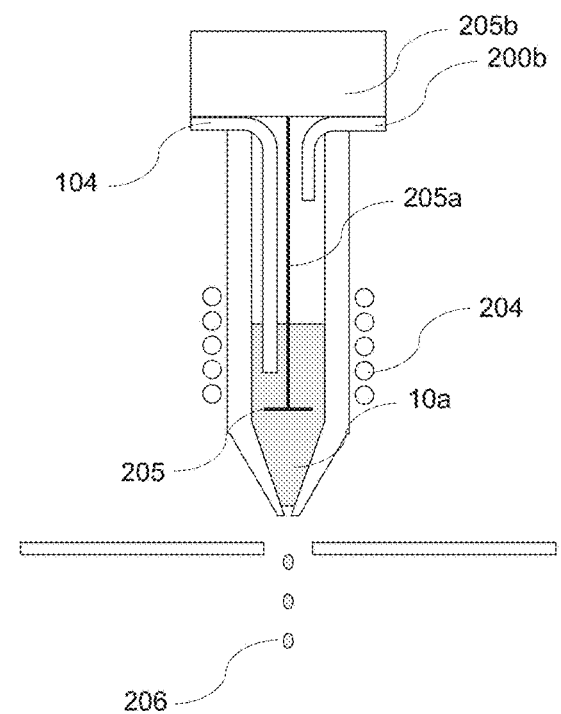

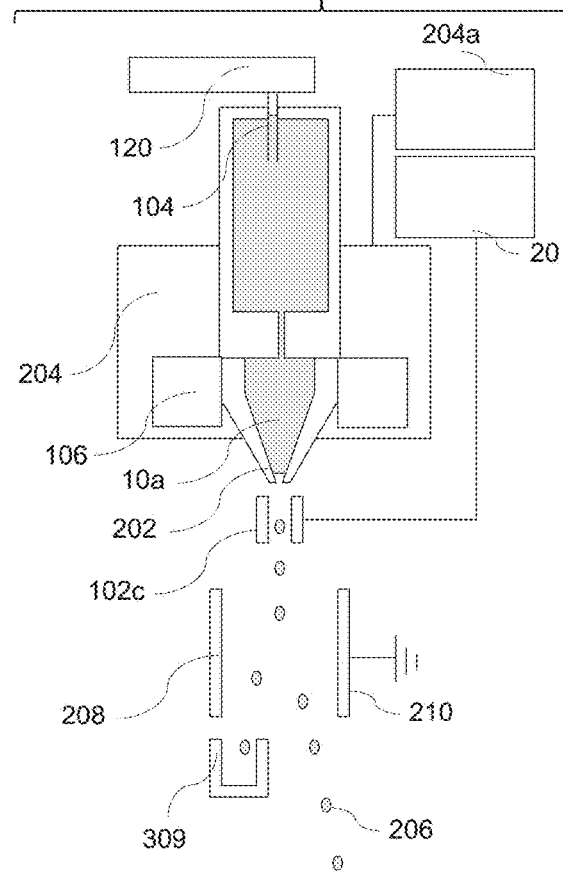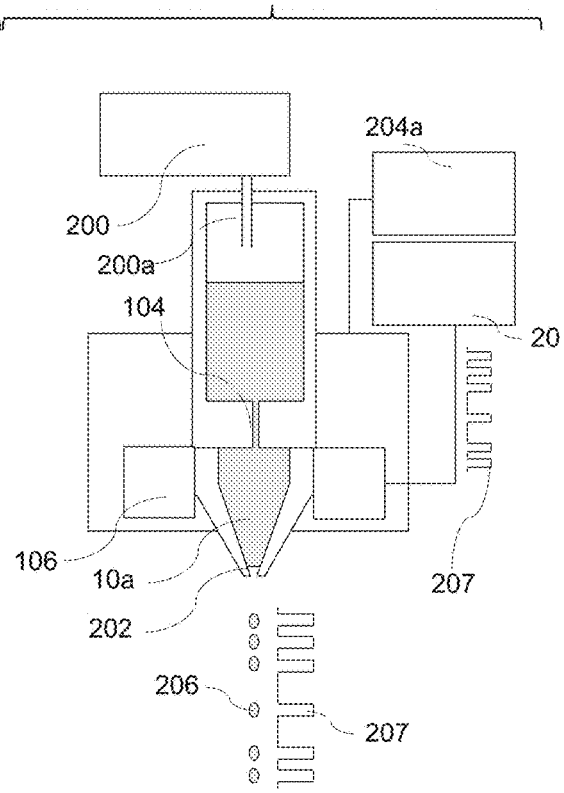

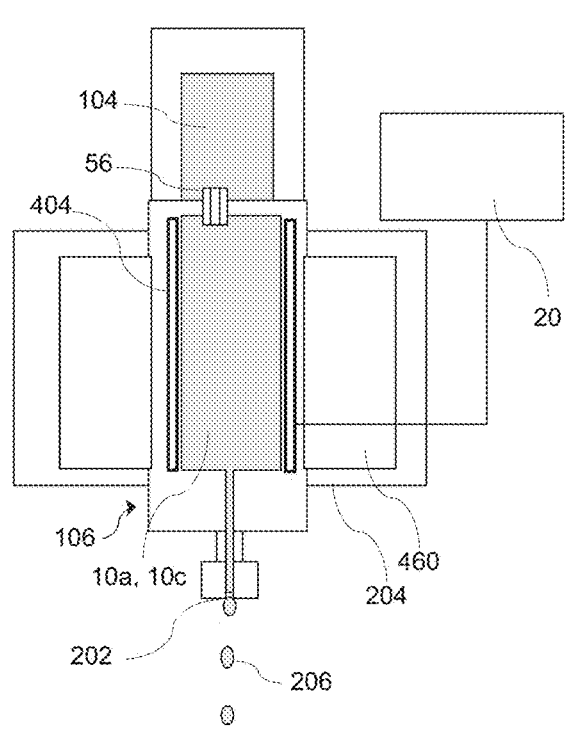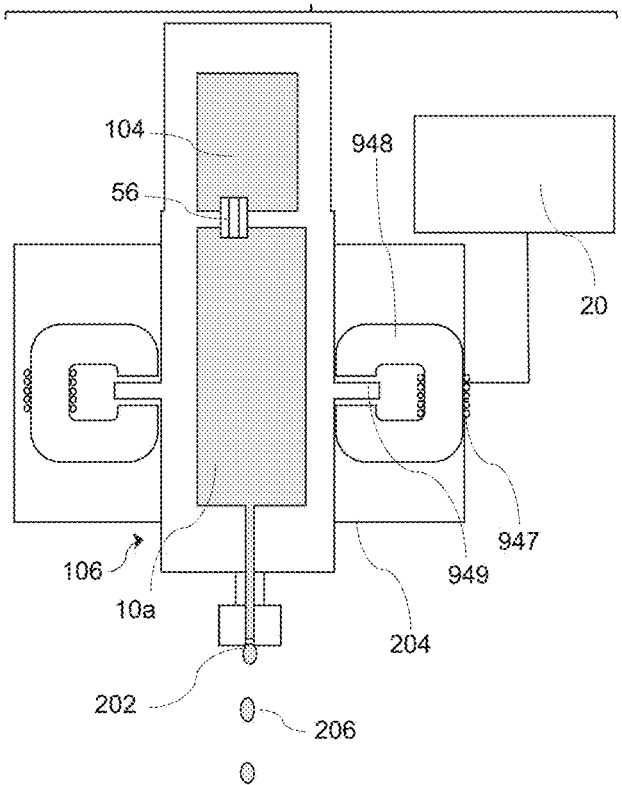

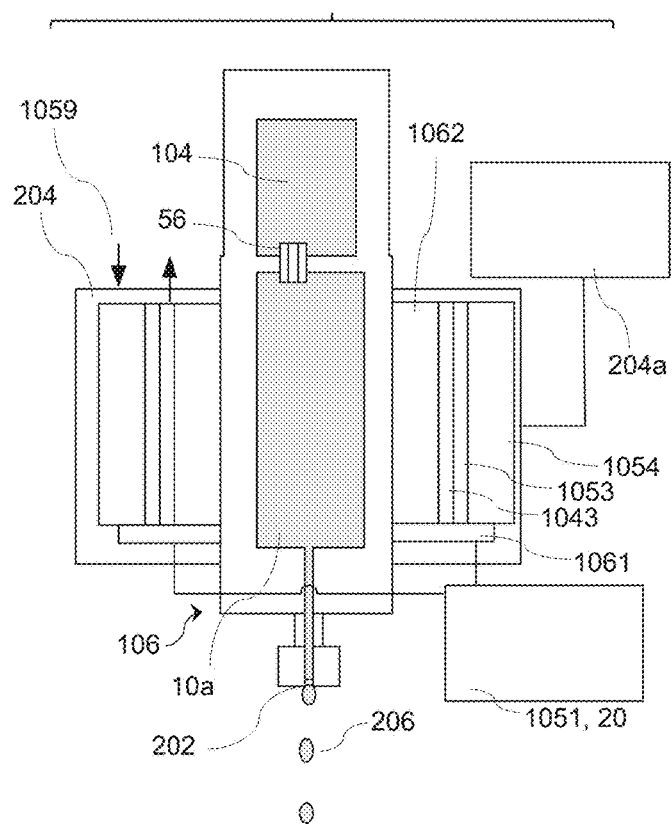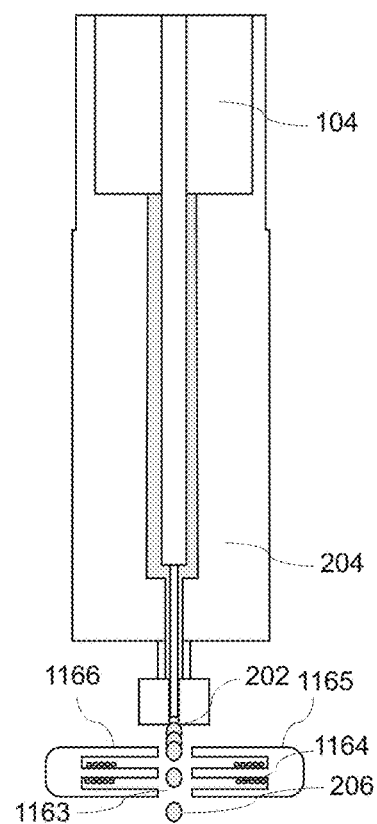

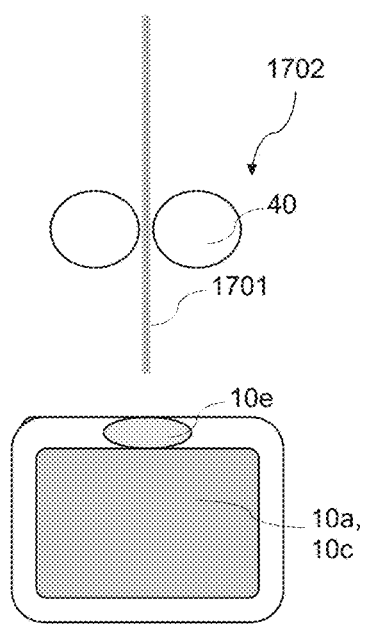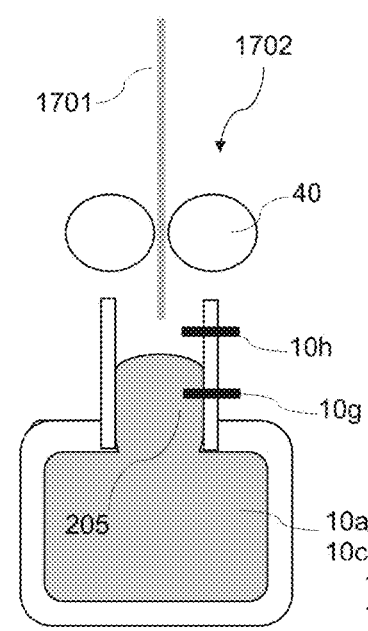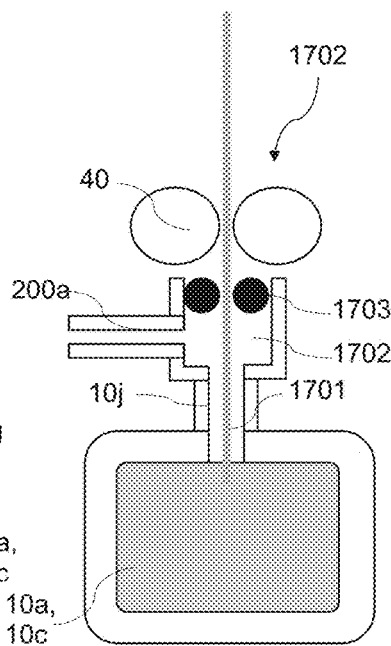

MOLTEN METAL JETTING FOR ADDITIVE MANUFACTURING

CROSS-REFERENCE TO RELATED APPLICATIONS

This application is a continuation of U.S. patent application Ser. No. 15/275,849, filed on Sep. 26, 2016 [now U.S. Pat. No. 10,315,247], which claims the benefit under 35 U.S.C. § 119(e) of U.S. Provisional Application Ser. No. 62/232,352, filed Sep. 24, 2015, both of which are herein incorporated by references in their entirety.

FIELD

Aspects relate to three dimensional printing by molten metal jetting.

BACKGROUND

"Three dimensional printing" as an art includes various methods for producing solid metal parts.

Although some researchers have prototyped metal jetting techniques for additive manufacturing, there is no commercially reliable and affordable method for additive manufacturing by molten metal jetting.

SUMMARY

According to one aspect of an embodiment of a method of molten metal jetting for additive manufacturing, a wire of solid metal is fed along a material feed path. The metal material is melted to a molten metal in a melt reservoir. The melt reservoir is pressurized to a predetermined pressure insufficient to eject droplets, and a pressure oscillation is generated in the molten metal in the reservoir to force one or both of jetting of the molten metal through a nozzle and/or formation of molten metal droplets by surface tension at the nozzle. The nozzle is driven to relatively move with respect to a build plate in at least three degrees of freedom. Successive layers of solidified metal are formed by accumulation of the molten metal droplets impacting a previously deposited layer of solidified metal and cooling thereon. Each successive layer may be traversed with a normalizing or leveling device, such as grinding wheel, ablating laser beam or electron beam, or reflowing laser beam or electron beam, to level each successive layer.

Optionally, the normalizing grinding wheel is driven to traverse with its rotating axis, or the laser or electron beam is swept, entirely within a plane parallel to a plane in which the layer is formed. Further optionally, the normalizing grinding wheel, laser, or electron beam generator is connected to and moved with the nozzle. Further optionally, the normalizing grinding wheel, laser beam, or electron beam removes sufficient material to shave both peaks and valleys in irregular surface. Further optionally, the normalizing grinding wheel, laser beam, or electron beam removes 10-80% of the deposited solidified metal height. Further optionally, a contact surface consisting of a line along the width of the grinding wheel or a swept laser beam or electron beam is traversed over an area of no more than 125% of the area of the previously deposited solidified metal layer.

Additionally, or in the alternative, one of an inert gas supply and an inert gas generator supplies an inert gas or an anoxic gas to shield the molten metal from oxidation. In this case, the supply of inert gas may be shared among at least two of an inert gas feed to maintain an oxidation-free environment in the melt reservoir; an inert gas feed to maintain an oxidation-free environment in the print chamber, and/or an inert gas feed to maintain an oxidation shield extending between the nozzle and the print bed and about the molten droplets as they are jetted.

According to another aspect of the embodiments, a method of molten metal jetting for additive manufacturing includes, or an apparatus performs, feeding a wire of solid metal along a material feed path. The metal material is melted to a molten metal in a melt reservoir, and the molten metal is pressurized in the melt reservoir to a predetermined pressure insufficient to eject droplets. Inert gas (or anoxic gas) is supplied to shield the molten metal from oxidation from one of an inert gas supply and an inert gas generator. A pressure oscillation is generated in the molten metal reservoir to force at least one of jetting of molten metal through a nozzle and formation of molten metal droplets by surface tension at the nozzle. The nozzle is driven to relatively move with respect to a build plate in at least three degrees of freedom. Successive layers of solidified metal are formed by accumulation of the molten metal droplets impacting a previously deposited layer of solidified metal and cooling thereon.

Optionally, the melt reservoir is loaded by introducing an initial charge of unmelted material to the melt reservoir. Inert gas may be fed into the print head, and/or an oxide removal agent may be introduced into the print head. The print head may be heated to activate the oxide removal agent. Metal and oxidized metal may be purged from the print head. Further optionally, metal and oxidized metal may be purged from the print head by feeding additional oxide removal agent, metal, and inert gas into the nozzle.

Alternatively, or in addition, before removing a part, associated with a locked/unlocked state of an electronic interlock on a sealed door, the anoxic chamber may be purged by at least one of removing oxygen from and flowing inert gas into the anoxic chamber; or, associated with a locked/unlocked state of an electronic interlock on a sealed door, the melt reservoir may be purged by at least one of removing oxygen from and flowing inert gas into the melt reservoir.

Alternatively, or in addition, before beginning printing, associated with a locked/unlocked state of an electronic interlock on a sealed door, the anoxic chamber may be purged by at least one of removing oxygen from and flowing inert gas into the anoxic chamber; or, associated with a locked/unlocked state of an electronic interlock on a sealed door, the melt reservoir may be purged by at least one of removing oxygen from and flowing inert gas into the melt reservoir.

Alternatively, or in addition, before beginning printing, associated with a locked/unlocked state of an electronic interlock on a sealed door, the melt reservoir may be purged by flowing anoxic gas through the melt reservoir in a gaseous volume in excess of the melt reservoir volume.

BRIEF DESCRIPTION OF DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 1 is a schematic representation of a multi-nozzle three-dimensional metal jetting printer.

FIG. 2 is a block diagram and schematic representation of a three dimensional printer system.

FIG. 3 is a flowchart describing the overall operation of the 3D printer of FIG. 2.

FIG. 4 is a schematic representation of one example of a print head, nozzle, and kinetic driver for a molten metal, which may be employed with the metal jetting printer of FIGS. 1-3.

FIG. 5 is a schematic representation of another example of a print head, nozzle, and kinetic driver for a molten metal, which may be employed with the metal jetting printer of FIGS. 1-3.

FIG. 6 is a schematic representation of an additional example of a print head, nozzle, and kinetic driver for a molten metal, which may be employed with the metal jetting printer of FIGS. 1-3.

FIG. 7 is a schematic representation of an additional example of a print head, nozzle, and kinetic driver for a molten metal, which may be employed with the metal jetting printer of FIGS. 1-3.

FIG. 8 is a schematic representation of an additional example of a print head, nozzle, and kinetic driver for a molten metal, which may be employed with the metal jetting printer of FIGS. 1-3.

FIG. 9 is a schematic representation of an additional example of a print head, nozzle, and kinetic driver for a molten metal, which may be employed with the metal jetting printer of FIGS. 1-3.

FIG. 10 is a schematic representation of an additional example of a print head, nozzle, and kinetic driver for a molten metal, which may be employed with the metal jetting printer of FIGS. 1-3.

FIG. 11 is a schematic representation of an additional example of a print head, nozzle, and kinetic driver for a molten metal, which may be employed with the metal jetting printer of FIGS. 1-3.

FIGS. 18-20 are schematic representations of wire or tape feeding or driving mechanisms, which may be used together with the print head structures or metal jetting printers of FIGS. 1-17.

DETAILED DESCRIPTION

Figure 12:
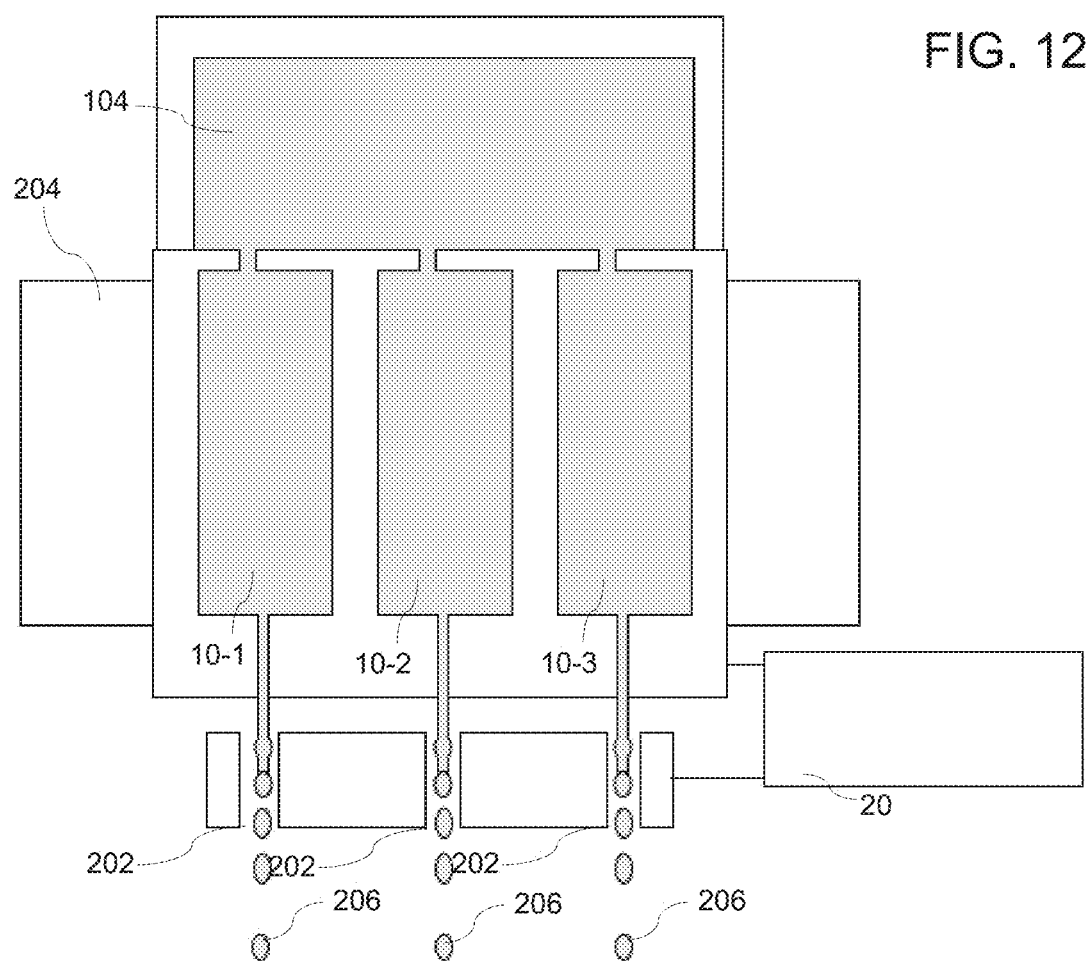
FIG. 12 is a schematic representation of an additional example of a print head, nozzle, and kinetic driver for a molten metal, which may be employed with the metal jetting printer of FIGS. 1-3.

This patent application incorporates the following disclosures by reference in their entireties: U.S. patent application Ser. Nos. 61/804,235; 61/815,531; 61/831,600; 61/847,113; 61/878,029; 61/880,129; 61/881,946; 61/883,440; 61/902,256; 61/907,431; and 62/080,890; 14/222,318; 14/297,437; and Ser. No. 14/333,881, which may be referred to herein as "Composite Filament Fabrication patent applications" or "CFF patent applications". Although the present disclosure discusses various molten metal jetting 3D printing systems, at least the mechanical and electrical motion, control, and sensor systems of the CFF patent applications may be used as discussed herein. In addition, U.S. Pat. Nos. 6,202,734; 5,337,961; 5,257,657; 5,598,200; 8,523,331; 8,721,032, and U.S. Patent Publication No. 20150273577, are incorporated herein by reference in their entireties.

The printer(s) of FIGS. 1-2, with at least two print heads 18, 10 or printing techniques, deposit with one head a molten metal jet 10, and with a remaining head 18 apply soluble support material. The secondary print head 18 may print fill material 18a to form walls, infill, coatings, and/or removable, dissolvable, or soluble support material.

The feed rate (the tangential or linear speed of the drive 40) and/or printing rate (e.g., the relative linear speed of the platen/part via the Z drive 120 and print head drives 116, 118) may be monitored or controlled to maintain compression, neutral tension, or positive tension within an unsupported zone. As shown in FIGS. 2 and 3, the controller 20 may control the height of the bottom of the molten metal jet 10 or secondary print head 18 to the top of the layer below as less than the diameter of the filament.

With reference to FIGS. 1 and 2, each of the printheads 18 and 10 are mounted on the same linear guide such that the X, Y motorized mechanism 116, 118 of the printer 1000 moves them in unison. A 1.75-1.8 mm; 3 mm or larger or smaller metal filament may be driven through, e.g., direct drive or a Bowden tube that may provide extrusion back pressure in a melt reservoir 10a or crucible. While the present disclosure emphasizes in some cases jetting aluminum as opposed to other metals, alternative metals may also be used, and "aluminum" in the description is interchangeable with "commercially valuable metal". Commercially valuable metals suitable for jetting include titanium and/or stainless steel as well as other metals resistant to oxidation at both high and low temperatures (e.g., amorphous metal, glassy metal or metallic glass). In the following text, nozzle and printhead materials, as well as melt reservoir or crucible, are made of materials of sufficiently high melting resistance to hold molten metal of the relevant type (e.g., ceramic for titanium or stainless steel).

A 3D printing method or apparatus by molten metal jetting includes at least one printhead 10 including at least one molten metal jet 10a, a material supply 40, 10b connected to the print head 10 and/or molten metal jet 10a for providing material that is jetted by the print head 10, a build plate 16 upon which a metal part 18 is additively formed, a set of at least 3 actuators 116, 118, 120 connected to the print head 10 and/or to the build plate 16 to relatively move them in at least 3 degrees of freedom (in many cases, X, Y, and Z Cartesian directions). A controller 20 regulates the relative positions of the print head 10 and build plate 16.

As discussed herein, the molten metal jet 10a may be constructed with different melting and jetting mechanisms. In one exemplary system, after leaving a jetting orifice tip or nozzle 202, a molten metal droplet 206 driven by a kinetic driver 106 may pass through a charging electrode system 102 and acquire a uniform charge, permitting the charged droplets 206 to be steered to X-Y locations on the build plate 16 with electrostatic members/plates. The charged droplets 206 can then be steered to specific positions on the target substrate 180 using electrostatic plates 208, 210. In another example, e.g., with a magnetohydrodynamic (MHD) kinetic driver, the MHD kinetic driver 106 converts modulated current into pressure pulses to dispense high temperature molten metal droplets 206. The shape and size of the jetting orifice 202, the surface tension and viscosity of the metal in the droplets 206, the wetting interaction between the metal and the orifice 202 material, and the configuration and timing of the modulation signal from the controller 20 may be tuned.

As noted, the molten metal jet may by magnetohydrodynamically driven. Molten metal may be supplied to a reservoir or crucible 10a, or melted therein, and maintained in a fluid state. A magnetic field may be applied to the fluid reservoir 10a, the field having a direction aligned with the print head 10 jetting direction. Electric current may be driven in a drive chamber (which may also act as the reservoir or crucible 10a) through the molten metal to exert a jetting direction force and subsequently in the opposite direction to form a droplet 206. The electric current may be an alternating electric current burst from a pulse generator. A temperature differential of the molten metal from the reservoir 10a to the jetter orifice 202 may be very small (a few degrees). The magnetic force may be provided by an electromagnet or any very strong rare earth (e.g., samarium-cobalt) permanent magnet. The kinetic driver 106 in this case may be formed from the molten metal itself, the magnetic field throughout, and the AC pulse current (and resulting Lorenz force).

The kinetic driver 106 may be any form of vibrating volume change in a molten fluid system. For example, pressurized molten metal may be ejected from an ejection orifice 202 of about 0.5 mm, driven by a kinetic driver 106 in the form of a vibrating plunger 205 vibrated by an audio speaker a powered by an amplifier and voltage pulse generator to eject droplets at a rate of 30 droplets per second at 350° C. An argon atmosphere in the build volume may prevent oxidation. In several of the molten metal jetting processes discussed herein, the reservoir 10a is kept at a pressure below that sufficient to eject droplets (e.g., by back pressure in a molten metal fluid path, by added inert gas pressure, by gravity, as some examples). The kinetic driver 106 tends to generate a pressure oscillation in the molten metal reservoir 10a to force at least one of jetting of molten metal through a nozzle and/or formation of molten metal droplets by surface tension at the nozzle. A kinetic driver 106 as discussed herein may do either or both (create a jet, or transform the jet otherwise generated into droplets, or create a jet of droplets).

With reference to FIG. 3, in printing each layer, the controller 20 may first determine whether G-code or other instructions for printing a part 180 includes a soluble material 18a path or a metal material 10c path, in step S2. If the path or toolpath to be printed is a metal path, then a metal jet printing process, using one or more of the exemplary print heads, printing structures, printer structures, and/or overall systems disclosed herein is conducted, as in step S4. If the path or toolpath to be printed is a soluble support path, then a soluble support printing process, using one or more of the exemplary print heads, printing structures, printer structures, and/or overall systems disclosed herein is conducted, as in step S6. If the path being printed is not the last path within a layer in step S10, the controller 20 moves in step S12 to the next path (S2), repeating until all the paths in a layer are complete (YES at S10). The controller 20 repeats until all slices have been completed (steps S16, S14), indicating that the entire part is complete (step S16).

Each section of description herein may use reference numbers appearing in FIGS. 1 to 3 as representative of an overall system. As one example of a molten metal jet, as show in FIG. 4, a molten metal melted by a heater 204 (induction coil) may be held in a reservoir 10a in a magnetic field induced by permanent magnets 208 cooled by frame 210 and coolant 304, and an electrical actuation current in the molten metal between electrodes 102a and 102b generates a pressure wave in the molten metal 23. The droplet 206 of molten metal is expelled through a nozzle orifice 202 by Lorenz force (relating to the electric current and the magnetic field vector), causing motion in the molten metal and pressure differences (pressure wave).

Following an induced pressure wave, as inertia in the system damps out, residual motion in the molten metal, e.g., a residual pressure wave, may generate a residual current which may be used as a feedback signal for control. The electrodes 102a, 102b creating the Lorenz force in the molten metal may be switched provide actuation current and permit detection of residual current. The acoustic behavior of the molten metal and the reservoir 10a may also be monitored as a feedback signal for control (e.g., acoustic behavior, frequency and amplitude and presence, are different between an operative and failing process).

As another example of a molten metal jet, as shown in FIG. 5, the kinetic driver 106 may be a relatively high temperature piezoelectric element 205b, e.g., lead metaniobate, strongly connected via a shaft 205a and disk plunger 205 to keep the piezoelectric actuator isolated from the molten metal heat. A function generator (not shown) may oscillate the piezoelectric transducer 205b, connected via the shaft 205a to vibrate the disk 205. Molten metal is maintained in a liquefied state by heaters 204. The piezoelectrically induced vibration and a pressure differential of 20-100 psi (via channel 320) between the reservoir 203 and an inert gas input 200b to the chamber may create a stream and droplets 206 from sapphire or ruby drilled orifices (one or more) 202.

In an additional example, as shown in FIG. 6, a molten metal may be pumped, e.g., gas-pressurized by an inert gas @ 100 psi, to a delivery tube 104. Pump 120 may be gas-pressured to deliver the molten metal to delivery tube 104 and through the tube (stainless steel, molybdenum, tungsten, ceramic, or the like) to orifice 202. A suitable gas to be used with a gas-pressured pump is clean, dry nitrogen under a pressure of about 100 psi. Argon is another exemplary gas. A heater 204 (e.g., induction) thermally coupled to tube 104 may maintain the metal molten. This type of kinetic driver 106 is optionally isolated from the heater 204. The kinetic driver 106 in this case may drive the tube 104 and/or assembly to excite a molten metal jet stream and induce a waveform (of appropriate frequency, amplitude, pulse duration, and pulse modulation according to the driving electrical signal) forming droplets 206.

As noted, droplet size may be a function of molten metal jet and/or orifice diameter and/or molten metal jet velocity and/or waveform frequency, amplitude, duration, or modulation. As shown in FIG. 6, droplets 206 may be selectively charged by a charge electrode 102c such that they may be steered, accelerated, or slowed by passing through electrostatic or high voltage/grounded 208, 210 plates in X, Y, and/or Z directions. Uncharged or selectively disposed droplets may be caught by a catcher or purge receiver 309, whereas charged droplets are deposited in appropriate locations 180.

Alternatively, or in addition, as shown in FIG. 7, in a so-called drop-on-demand mode, molten metal may remain stationary in delivery tube 104 in the absence of external force. Pulse length, amplitude, frequency, and/or modulation may be tuned to form a signal 207 to deliver modulated single droplets 206 of molten metal through orifice 202.

As another example of types of kinetic drivers 106 that may be used (in each case, a surrounding, embedded, or integrated heat source maintains the molten metal in a high temperature, molten metal state). FIG. 8 shows a kinetic driver 106 employing current-to-current excitation, where a single, large pulse of current enters conductive strip 404, creating opposing current forces. A large, single force is reflected by acoustic retaining ring 460 toward a tuned fluid chamber 10c as a pressure pulse causing a quantity of molten metal to be moved through fluid chamber 10c and to be expelled from orifice 202, is coupled to the tuned fluid chamber 10c. Surface tension forms a droplet 206. A flow restricting orifice 56 permits loading and refilling of molten metal into the chamber 10a but prevents backflow or backjetting opposite to the orifice 202 (in each of the embodiments showing the flow restricting orifice 56 or its equivalent).

FIG. 9 shows another form of kinetic driver 106 employing current-to-magnetic-material excitation, where a single, large pulse of current to current windings 947 causes electromagnetic coil yoke 948 to draw armature 949 radially outward, as described above, creating a single perturbation force on the molten metal within chamber 10d, moving the molten metal through fluid chamber 10d and expelling a droplet 206 formed by surface tension from orifice 202.

FIG. 10 shows another form of kinetic driver 106 in the form of magnetostriction excitation, employing an insulator 1062 which is an acoustically conducting and thermally insulating material, such as glass, ceramic, etc. A magnetostrictive cylinder 1053 is sandwiched between metal (e.g., stainless steel) conductors 1043 and 1054. Heater 204 maintains the metal in a molten state but is not in direct contact with the kinetic driver 106, and magnetostrictive cylinder 1053 may be cooled by drawing heat away through conductors 1043 and 1054 to thermally electric tap ring 1061, coupled to heat conduit 1050, which draws heat to thermal electric cooler 1051. Pulsed current may be supplied to current inlet 1059, producing a magnetic field along the circumferential axis of the delivery tube, the magnetostrictive cylinder 1053 changing dimensions in response to the magnetic field. A perturbation force may then act through conductor 1043 and acoustically conductive insulator 1062 and on delivery tube 104 or the assembly, breaking the jet stream into droplets 206 shortly after the jet stream exits orifice 202.

FIG. 11 shows an additional kinetic driver 106 employing magnetohydrodynamic excitation, where magnetic field yoke 1165 with spacings between arms 1166, corresponding to points of field intensity maximums in a magnetic field generated when AC or DC current is applied to current windings 1164. A periodic magnetic field may act upon a molten metal jet stream (e.g., pressurized to flow) passing from orifice 202 into air gap 1153 in the yoke 1165, producing perturbations causing the jet to break up into droplets 206, e.g., per a synchronous condition.

Alternatively, a spooled aluminum filament 10b may be pre-heated and melted in a reservoir or crucible upstream from a printhead/nozzle 10 to form a reservoir 10a of molten metal. A pulsed magnetic field may induce a transient current within the molten metal 10a, the field and current coupling to create a Lorentz force that ejects a molten metal droplet 206 whose velocity may depend on the applied Lorentz force pressure. Alternatively, or in addition, an actuator may include a molten metal reservoir 203, temperature control (e.g., via a heater 204), and a pneumatic connection 200a (for inert gas used with the kinetic driver).

Nozzles or orifices 202 may be straight tubes, tapered, or otherwise internally shaped. One additional variety is a star-shaped silicon nozzle 202 (e.g., with a channel formed as a multipointed star prism), which may include microfluidic channels. A droplet 206 may be formed and suspended on points of the star-shaped nozzle 202. A droplet 206 may be is centered if the repellent capillary pressure of the nozzle grooves is too high for the molten metal to move into the grooves. In one example, thirteen or a higher number of nozzle grooves create a contact angle of about 120 degrees toward the nozzle material. Using inert gas as an actuator or kinetic driver, when pressure in the molten metal column at the nozzle entrance is higher than the applied actuation on the top of the molten metal, gas shear flow may pull a molten metal plug toward the nozzle outlet 202, the molten metal column may become constricted, and the droplet 206 may finally break off.

Alternatively or in addition, in the above systems, one or more heaters such as induction coil(s) 204 about, or within, the melt chamber 203 may be used in a heating mode to melt metal (e.g., high frequency, low amplitude) and also, or in the alternative, in a kinetic driver mode to create physical oscillations on a driver plate 205 or coupled with a magnetic field, directly within molten metal (e.g., low frequency, high amplitude) and coupled with an appropriate nozzle 202 as described, propel molten metal.

In between successive additive layers jetted by the molten metal jet, and/or in between successive steps for forming such layers, the control system (including the controller 20), an optional sensor array 600 and an optional mechanical leveling mechanism may perform operations to level or compensate for imperfections in a layer, via selective jetting on the previous layer, current layer, or a successive layer, or via successive material removal on the previous layer, current layer, or a successive layer.

For example, a stochastic droplet size and landing position can result in uneven piling up of printed material. It may be advantageous to integrate a skimming or doctor blade method or system to eliminate vertically protruding peaks in a layer or layers, and level the part in a repeated, or as-needed fashion.

In one preferred embodiment, as shown in FIG. 1, the 3D printer includes a surface grinding wheel 502. The grinding wheel 502 is optimally self-dressing with an integrated diamond tip tool post. After every layer, the controller 20 causes a grinding wheel motor (not shown) to rotate the grinding wheel 502 and via actuators 116, 118, and/or 120 the grinding wheel 502 skims the part 180, ensuring the removal of the peaks 180a. One of the main advantages of the grinding wheel 502 is the low contact force, low heat imparted to the part, and even resultant surface. Depending on the interval of the grinding operation, and material to be ground, different grit wheels can be-chosen. In one embodiment, a fine, 150 grit white aluminum oxide wheel would be selected.

A further advantage of the inclusion of the grinding wheel 502 is the ability to automatically level the printing bed 16 (e.g., the controller 20 controls the grinding wheel motor and at least some of actuators 116, 118, and 120 to grind a layer from the print bed 16 itself). Dressing the bed to ensure flatness may eliminate major failure modes of 3D printing, wherein the surface tolerance of the part 180 is compromised by the lack of flatness of the bed 16. Further, using the grinding wheel 502 to flatten the printing surface 16 ensures a consistent active gap between the printhead 10 and the first layers of the part 180. This is useful for ensuring dimensional accuracy of the part 180, as well as for ensuring good adhesion of the part 180 to the printing surface 16.

In one embodiment, the print bed 16 is a reusable surface wherein the part 180 is knocked off, or scraped off, after printing. In another version, a disposable, sacrificial layer 16b is used covering the print bed 16. Such a layer 16b may be a thin sheet of the material that is the same, or similar to the material of the part 180 to be printed (stainless steel, titanium, aluminum or the like) that is held down to the print bed 16 by means of an vacuum chuck 16a integrated in the print bed 16. If desired, the flatness of the vacuum chuck 16a, and the squareness to the print head 16, can be ensured by using the grinding wheel 502 to square the print bed 16. Additionally, or alternatively, the sacrificial print surface can be attached to the print bed 16, and then made flat and parallel to the print head 10 by dressing the surface with the grinding wheel 502.

In another embodiment, as seen in 2D printing, the flatness of the deposited layer can be ensured by means of optical inspection, feedback, and compensation using an optical array 600 (e.g., such as a laser scanner, camera, RGBD camera, or the like). In 2D printing, for example, a print nozzle 10 can clog, which may present as a blank streak in the printed image. Inline inspection systems 600 may catch the clogged nozzle, and the controller 20 may, e.g., in response, increase a drop size of neighboring nozzles 10-1, 10-2, 10-3 (in the case of a multi-nozzle or parallel print head, e.g., as shown in FIG. 12), to compensate for the defect. This enables the printer 1000 to maintain operation despite damage to one or more multiple nozzles 10-1, 10-2, 10-3, 10-n in the system.

Another aspect of the disclosed invention is to build in fault tolerance to clogs in the print head 10 or nozzle/orifice 202. For example, if one of the print nozzles 202 is clogged, the droplet 206 size of the neighboring print nozzles 202 of neighboring print heads 10-1, 10-2, 10-3, 10-n can be increased to compensate for the clog. At the same time, the frequency of the pulses or other distribution force provided by the kinetic driver(s) 106 of the neighboring nozzles 202 may be reduced to effectively reduce the over-stuffing of the part 180. Unlike 2D printing, however, the droplets 206 will not simply "bleed" into the neighboring areas of the printed part 180. Instead, oversized or additional droplets 206 will pile up and create ridge that may be leveled by the grinding wheel 502.

In an alternative embodiment, when one print nozzle 202 of a parallel or parallelized array of printheads 10-1, 10-2, 10-3, 10-n is deemed to stop working, the immediate neighboring nozzles 202 can be increased in drop size, while the two-over or second neighbors can be reduced in drop size, as to prevent the excessive buildup of material (e.g., in a profile like the letters "oOxOo", where "x" is the clogged printhead, "O" are the larger immediate neighbors, and "o" are the two-over neighbors). In order to achieve the maximal packing density, the second neighbors can be shot out of phase from the immediate neighbors in order to substantially, approximately match the packing density.

Optionally, in the case of soft metal printing, such as aluminum, the leveling system may be achieved by a rotating end mill instead of a grinding wheel 502 (but arranged in an interchangeable manner), a sanding apparatus, or any of a plurality of methods to remove minute amount of material.

In another embodiment, a laser cutter/smoother 1302 may be alternatively (or additionally) used to level high peaks in the system. The laser cutter 1302 is designed to operate by sweeping an arc through the top surface plane. This 1-D arc simplifies the required optics, and sweeps across the top of the printed part area 180, effectively shaving any peaks down. Two exemplary methods of peak shaving may be employed. The first method, ablation, acts like a laser cutter, removing the metal. An alternative process, laser smoothing, melts and reflows the top surface, using surface tension to smooth the surface. In another embodiment, the laser 1302 is mounted to the print head 10 (and travels relative to the print bed in three degrees of freedom), and is able to selectively smooth, or ablate high spots in the part 180. Additionally, the smoothing function allows said laser 1302 to fill in low spots.

In another embodiment, as shown in FIG. 1, an in-situ, high-speed optical inspection system 600 is built into the printer 1000. In one preferred embodiment, a trailing optical CCD (e.g., a line CCD or an area CCD) 600 is mounted to the print head 10 that scans the surface of the part for defects. The primary, layer-to-layer defects of interest are peaks 180a and valleys 180b (e.g., as shown in FIGS. 13-18). These peaks and valleys 180a, 180b can be quickly identified by strobing or constant light sources from a plurality of different angles, e.g., via strobe lights 400a, 400b such that the peaks and valleys 180a, 180b become visible through differential shadows. Optimally, the strobe frequency, and head 10 travel speed align such that the relevant pixels from one frame to the next are an integer shift in the grid (maximizing contrast). Further, the wavelength of the light in each direction may be controlled such that constructive interference may speed up data collection. A plurality of optical inspection techniques, including laser range finders, laser inspection systems, and the like can be used to gain detailed information on the surface structure of the part 180. This information may be processed real time, or optimally in a cloud computing environment to accelerate the computation cycle. The feedback loop for this information can be laser smoothing, ablation, or modification of the metal jet deposition on the next layer. For example, a valley 180b would receive a larger droplet 206 on the next layer, whereas a peak 180a would have a deletion of one or more droplets 206 in the next layer to eliminate the buildup. This iterative control and feedback would ensure a smooth, consistent part without accumulation errors.

In order to supply the molten metal jet 10a and/or the support material jet 18a with a predictable, reliable, and/or steady supply or pressure of unoxidized materials to be melted and/or jetted, as well as to maintain the melted materials in an unoxidized condition, the control system 20, an optional sensor set, e.g., 600, and an optional set of actuators, e.g., 502, 1302 may perform operations within a gas and/gas conduit system to feed, supply, meter gases to or from a build plate 16, build chamber 306, feed management system (e.g., as shown in FIG. 18), melt zone 10a, or molten metal jet 10. In addition, the control system 20, an optional sensor set, e.g., 600, and an optional set of actuators, e.g., 502, 1302 may perform operations to monitor, control, manage, set, and/or change the temperature of the build plate 16, build chamber 306, part 180, molten metal jet 10, molten metal 10c, melt reservoir or crucible 10a, and/or material supply (e.g., as shown in FIG. 18).

For example, an inert gas may be used in a plurality of ways to shield both the part 180 being made, and the metal droplets 206 that are en route to the part while printing. A first method of shielding is to surround the print nozzle 10 with an, e.g., ceramic collet 1304 that serves to direct and flow shielding gas over the ejected droplets 206 and the printed part 180. This embodiment may be suitable for large build areas that cannot fit within a chamber 306.

Another embodiment encloses the entire printing area 306 in an anoxic environment. The anoxic environment can be achieved by purging the chamber with inert gas, such as argon, nitrogen, or the like. Argon is readily available in pressurized bottles. However, a preferred embodiment reduces dependence upon large industrial containers, with the possibility of an office-friendly 3D printer.

One embodiment creates an anoxic environment through the inclusion of an inert gas generator 200 into the printer 1000, which may be connected to either or both of the print head (via, e.g., line 200a) and the printer anoxic chamber (e.g., vial line 200b). A suitable candidate may be a Pressure Swing Adsorption nitrogen generator, including the motorized gas pump 200d connected to and controlled by the controller 20. In one embodiment, the print chamber 306 may be a pressure sealed environment similar to a commercially available vacuum chamber. In this configuration, the anoxic environment may be achieved by vacuum pumping the print chamber down with a motorized vacuum pump 200e connected to and controlled by the controller 20. Alternatively, or in conjunction, nitrogen gas may be pumped into the chamber, diluting out the concentration of oxygen. A pre-purge routine may involve flowing inert gas into the chamber 306 for a sufficiently long time to dilute the chamber oxygen content to an acceptable level for the given material to be printed.

In another preferred embodiment, the anoxic environment may be accelerated through the use of a Solid Electrolyte Oxygen Separation pump employed as the inert gas generator 200. These solid state electrode devices may be 100% selective for oxygen, thereby accelerating the creation of the anoxic environment, and may drive the lowest possible level of oxygen in the system. The chamber gas (feed air) may be pumped over a ceramic separator, which extracts oxygen, and exhausts the gas (which includes only air components) external to the printer 100.

Under normal usage, in order to minimize the warm up time for the printer, the anoxic environment may be maintained. After a print job is completed, the chamber 306 may be opened to remove the part 180, which will contaminate the chamber with oxygen. As shown in FIG. 1, when the anoxic chamber door 300 is closed, the controller 20 of the printer may (via an anoxic interlock sensor 302) in response begin pumping the chamber 306 toward an anoxic environment through the use of one or more of the noted purifying processes (vacuum pump extraction, inert gas purge, oxygen extraction pump, or oxygen absorbers).

In order to provide the molten metal jet 10 with a soluble or removable support material deposition such that overhangs, cantilevers, bridges, and/or flyers can be printed onto an underlying support or base, the control system 20, an optional sensor set, e.g., 500, and an optional set of actuators may perform operations within a material feed and/or support material jetting system to form soluble and other supports.

For example, as shown in FIG. 1, a soluble support material can be printed with a second print head 18. It should be noted this second print head 18 may be used in conjunction with any metal print head 10 discussed herein, including multi-nozzle or parallelized systems. As in plastic extrusion printing, this material serves as a backing system to hold up (support) the model layer about to be printed. One embodiment of metal jet printing may use water soluble resin (plastic) material, such as PolyVinyl Alcohol (PVA) as a support material. This material is readily soluble in cold water, and is further able to be fed into the print head 18 through use of a wire feed system, or molten metal feed system. As an alternative to PVA or high temperature soluble polymers, nitrate-based salts or chloride-based salts, optionally quenching salts, may be used to form soluble supports. Quenching salts are available in granular, briquette or flake form, and may be fed from a hopper through a tube to a melt chamber of print head 18. Nitrate-based salts have melting points that span the 135 to 330° C. temperature range. Chloride-based salts quenching salts are eutectic mixtures of chlorides of calcium, barium, sodium and potassium. The two most commonly used chloride-based quenching salts have melting points of 455° C. and 495° C.

Figure 13:
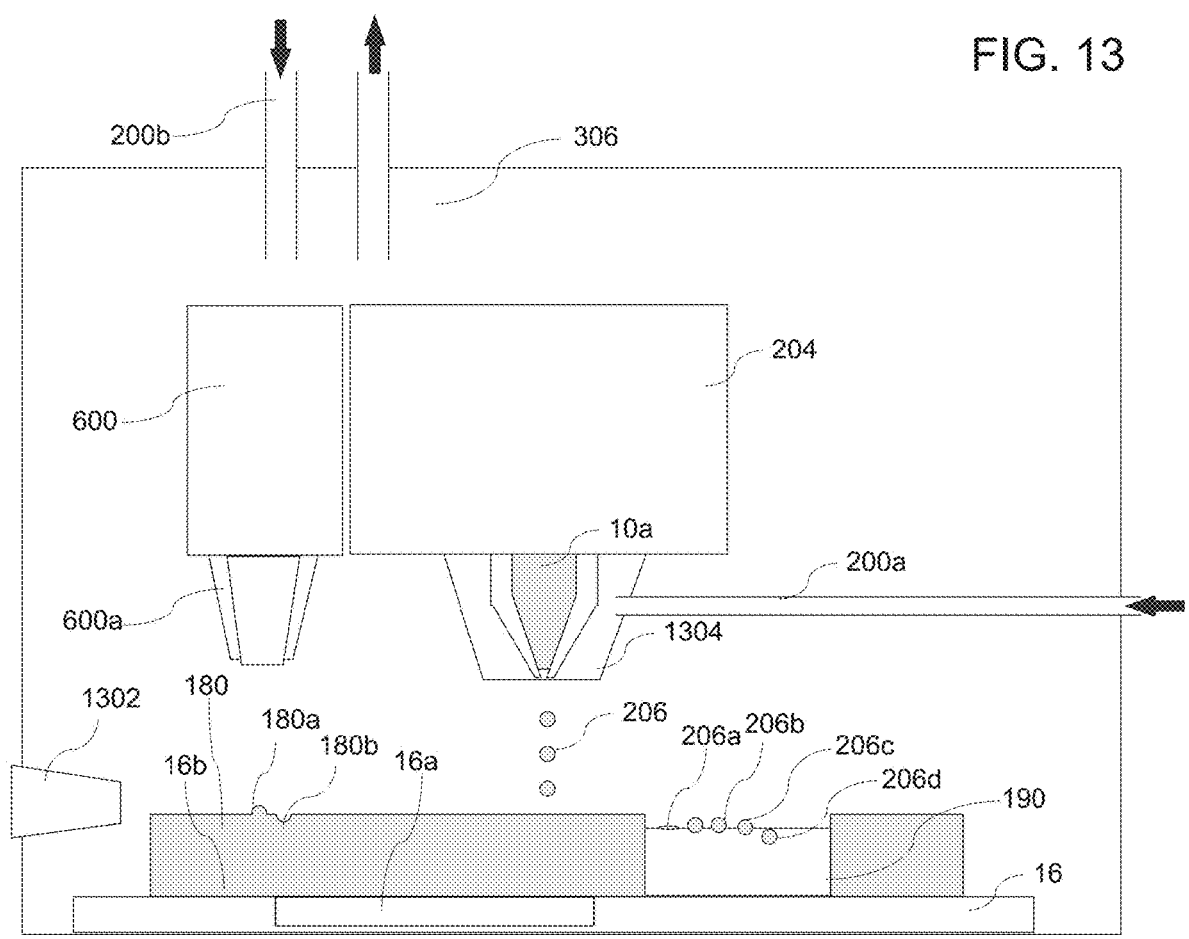
FIG. 13 is a schematic representation of a metal jetting printer, which may be used together with the print head structures of FIGS. 4-12 and/or the metal jetting printer structure of FIGS. 1-3.

An additional utility of soluble supports may be provided in the first few layers of a model printed on top of them. Depending on the combination of model material (metal) and support material used, different anchor strategies may be employed. A first anchor strategy is to embed the first layer droplets 206 into the part. Printing in PVA plastic or the other support materials discussed may enable a molten droplet 206 to both stick to, and partially submerge into, a soluble support layer 190 (e.g., as shown in FIG. 13, a flattened droplet 206a flattened onto the soluble material 190 surface, as well as a 25% submerged droplet 206b, 50% submerged droplet 206c, and 100% submerged droplet 206d). A submersion level between 0-100% of droplet height (or deeper) may be moderated through a different controls connected to the controller 20, including print head temperature (a print head heater), printhead distance from the support material (controlled by Z axis position, or through an additional high-offset print head specifically designed for printing support layers), amplitude of a driving force creating a droplet 206 (thereby droplet size, mass, and thermal content), inert gas shielding flow (increasing flow will cool the droplets, while decreasing flow will allow the droplets to retain higher heat), and/or heating of the soluble support surface (through laser, infrared or the like) to preheat the surface and thereby enable deeper penetration into the surface.

Figure 14:
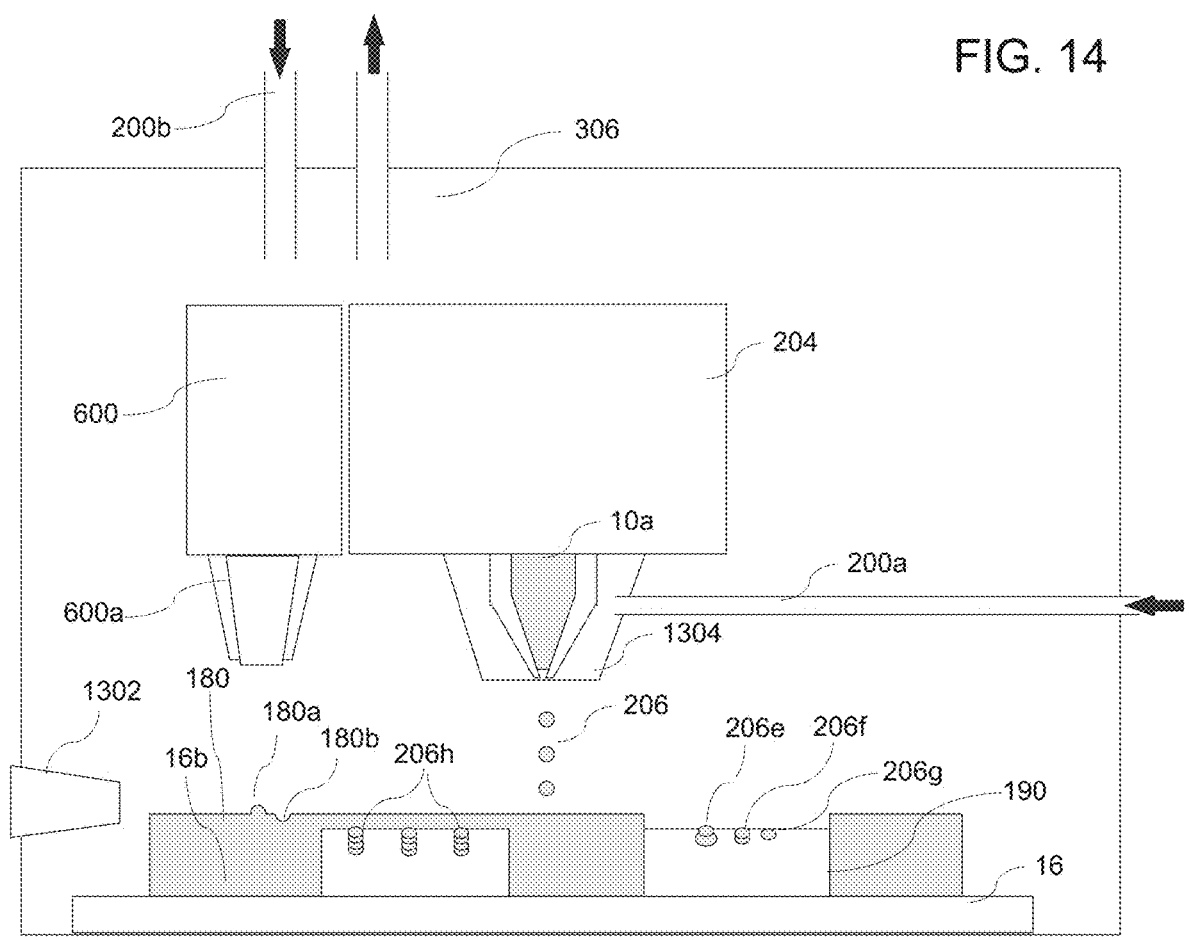
FIG. 14 is a schematic representation of a metal jetting printer, which may be used together with the print head structures of FIGS. 4-12 and/or the metal jetting printer structure of FIGS. 1-3.

A second anchor strategy is to "double tap", as shown in FIG. 14, whereby the initial droplet is followed with a second droplet jetted in rapid succession such that the second droplet 206e merges with, and partially substantially embeds in the first droplet, e.g., as an embed 206e, or as a stack 206f, or as a smaller embed 206g. This technique may allow a larger anchor to be formed, and indeed may raise the heat capacity of the droplets 206e-206g, and helps to further anchor the first layer into the soluble support 180.

Figure 15:
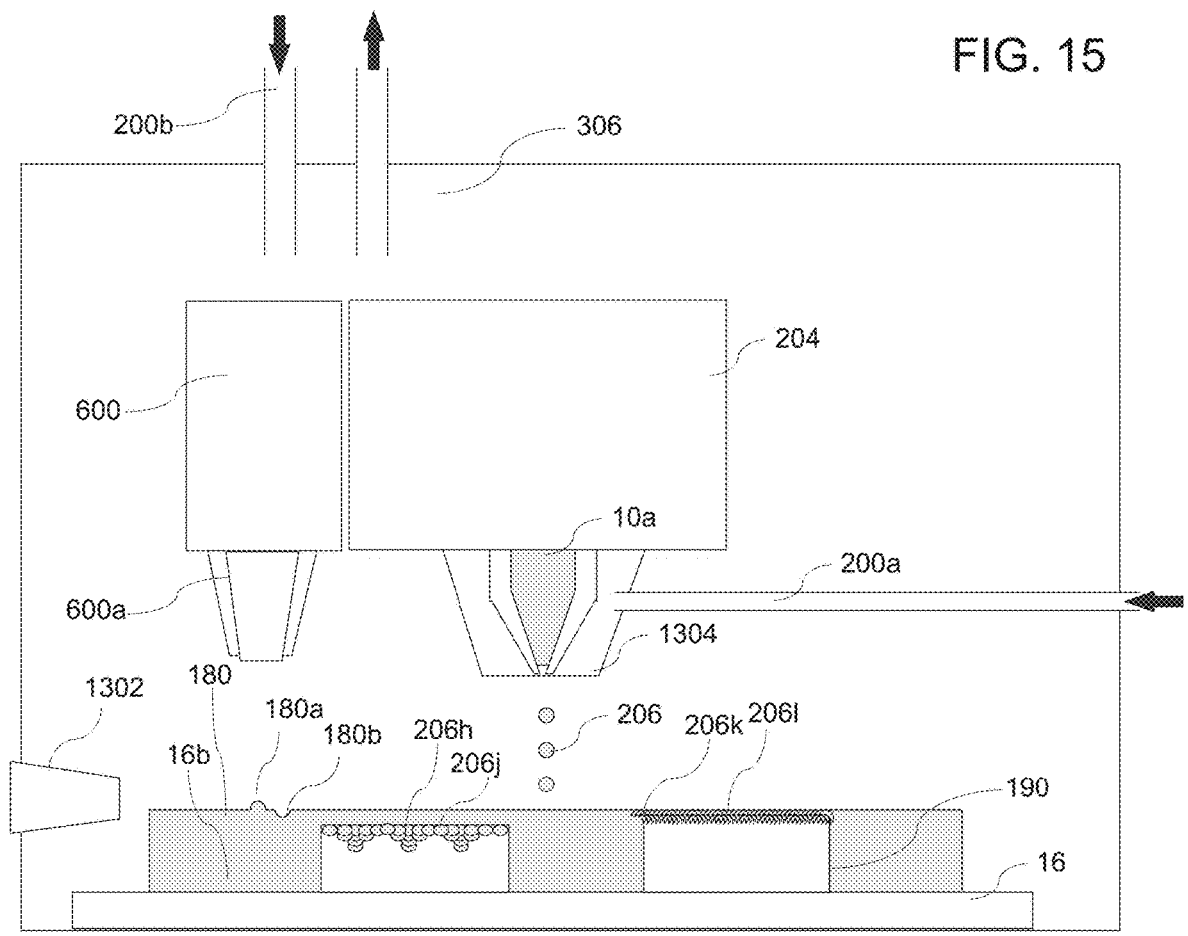
FIG. 15 is another schematic representation of a metal jetting printer, which may be used together with the print head structures of FIGS. 4-12 and/or the metal jetting printer structure of FIGS. 1-3.

Another method for anchoring supports, as shown in FIG. 14, may involve starting to build anchor dendrites 206h before a top surface of the model material 180. Dendrite 206h printing may start 1-10 layers below a first part layer to be printed on top of the support 190. This may provide an anchor to attach and secure the part 180 to the support material 190. The frequency and density of such dendrites 106h can be increased to provide increased adhesion. This method of anchoring may also be useful in the case of dual metal printing, whereby dissimilar metals may be mechanically fastened together through the repeated barb-like structure of one metal that is mechanically surrounded, and locked in place, by a second metal. As shown in FIG. 15, another method of support may expansion piles 206j of droplets on top of dendrites 106h through successive layers to provide a first layer surface of model material for adhesion and strength purposes.

As shown in FIG. 15, another method of supports may be to construct a bridge 2061 of droplets that anchor at one point of the part, and extend to outward across the support (optionally to another section). Building a bridge 2061 may be controlled by landing the droplets 206 in an overlapping fashion. Bridge construction can be tuned for both the model material 180, and the support material 190. For example, landing the droplets 206 in quick succession may increase the temperature of the bridge construction front. The temperature may be further increased by using a low coefficient of thermal expansion (CTE) support material 190. Cooling the bridge 2061 may be accomplished by increasing the time interval between landed drops 206, as well as increasing the shielding gas flow, or Z height offset (travel time).

Figure 16:
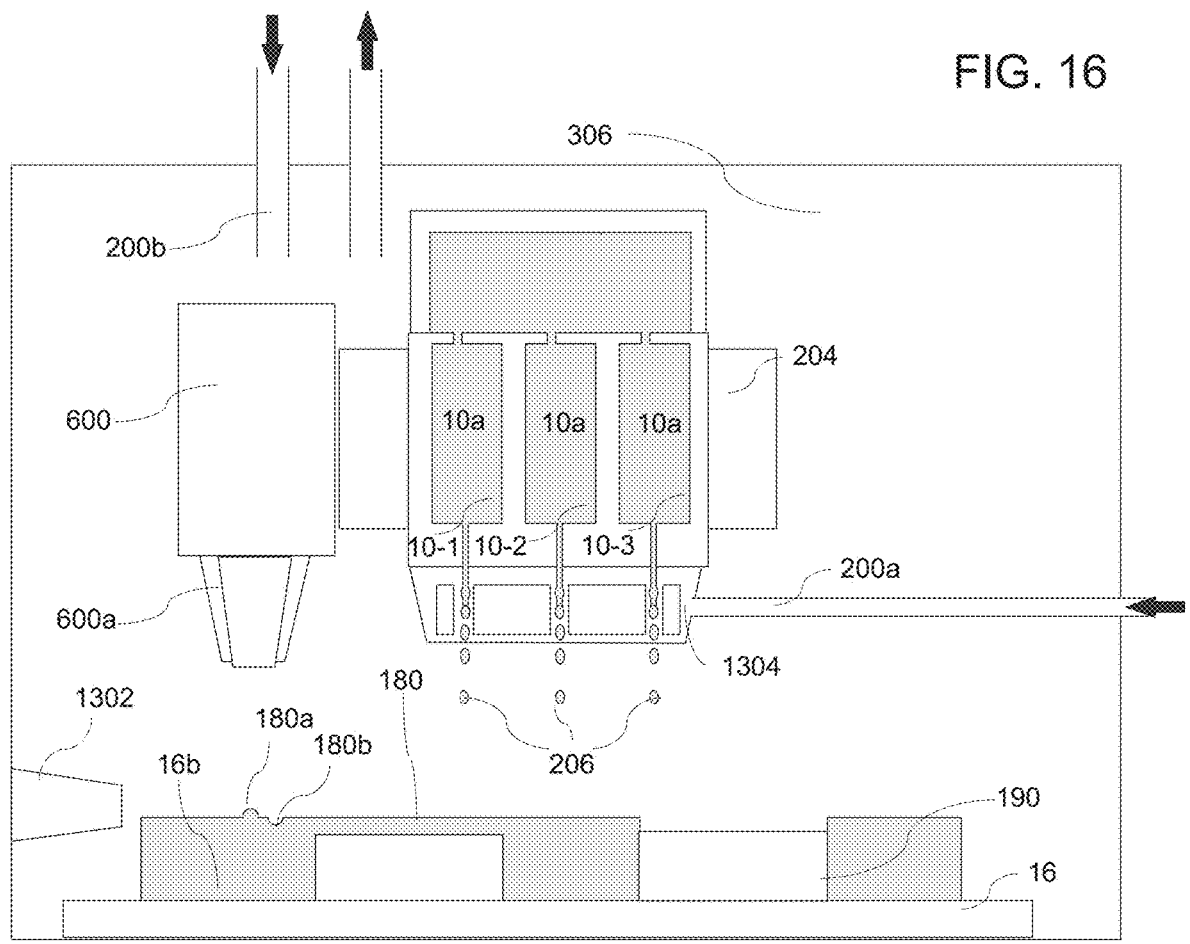
FIG. 16 is an additional schematic representation of a metal jetting printer, which may be used together with the print head structures of FIGS. 4-12 and/or the metal jetting printer structure of FIGS. 1-3.

In order to provide a plurality of molten metal jets 10 which may print at a higher speed or other performance improvement, the control system 20, an optional sensor set, e.g., 600, and an optional set of support members and actuators may perform operations within a material feed and/or support material jetting system to jet molten material in one or more parallel deposition systems. For example, as shown in FIG. 16, multiple print heads 10 can be parallelized to achieve higher throughput in the printer 1000. The print heads 10 may have independent crucibles 10a, or share a common crucible 10a, pressure (material feed) or kinetic driver 106 system. Each nozzle 10 may have independent droplet 206 control via one of the previously described kinetic driver 106 and/or modulator systems.

In order to supply the molten metal jet 10a and/or the support material jet 18a with a predictable, reliable, and/or steady supply or pressure of materials to be melted and/or jetted, the control system 20, an optional sensor set e.g., 600, and an optional set of actuators, e.g., 502, 1302 may perform operations within a material supply and feed management system to feed or supply solidified metal to a melt zone, crucible, pre-melt, reservoir 10a or the like upstream of the molten metal jet. The feed management system may be integrated within or to the melt zone 10a.

Figure 17:
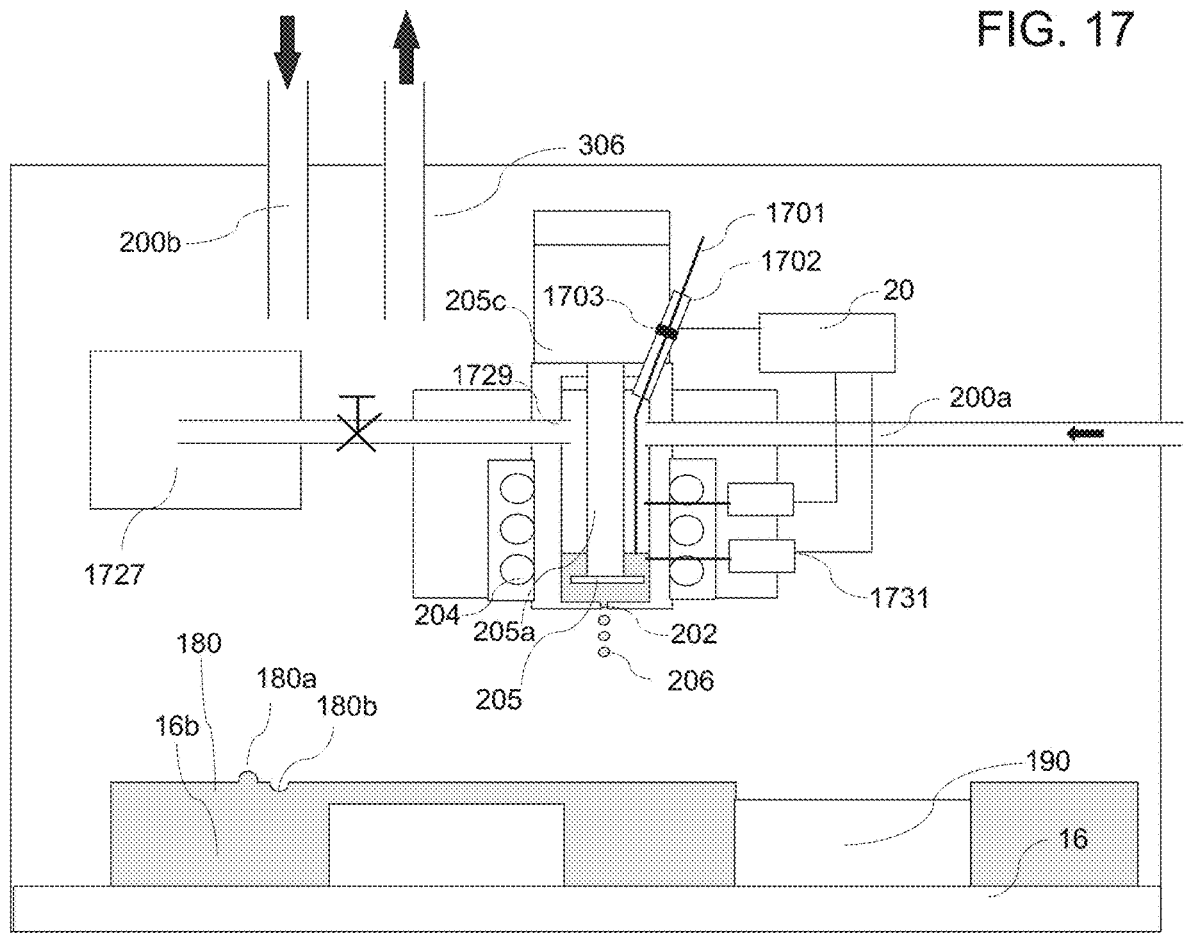
FIG. 17 is an additional schematic representation of a metal jetting printer, which may be used together with the print head structures of FIGS. 4-12 and/or the metal jetting printer structure of FIGS. 1-3.

As shown in FIG. 17, in either single or parallelized, multiple form, a wire (or bar or tape) supply permits continuous resupply and the amount of molten or molten metal acted upon by the kinetic driver 106 may be kept as small as is practical (reducing energy and heat shielding needs, among others). The melted material 10c may be kept under controlled and responsive pressure by a heat insulating fluid such as an inert gas. Sealing the wire 1701 circumference in a location remote from the melt chamber 10a, and or driving the wire 1701 via a drive in a remote location, permits less temperature resistant sealing devices (e.g., such as O-ring 1703). In addition, a kinetic driver 106 with an active component remote from the melt chamber and a driven component within the melt chamber 10a (e.g., an active vibrator 205c in a cooler zone connected via a shaft 105a to a plate 205 in the heated zone 10a heated by the induction heater 204) isolates temperature sensitive active vibrators (such as piezo elements 205c). An overflow outlet 1729 allows any surface oxidized metal to be released to a waste container 1727, and level sensors 1731 connected to controller 20 permit the molten metal 10c amount to be controlled by controller 20 driving the driver 1702. Heat insulating and/or inert gas such as argon, etc., may be provided behind the molten metal reservoir 10a via channel 200a, and may provide ejection pressure and also prevents oxidation of the melted metal 10c.

As another example, a wire feed system 1702 may feed wire 1701 that is substantially similar to welding wire, into the crucible 10a that is in fluid communication with the print head 10. As shown in FIG. 18, molten material 10c fills the crucible 10a such that a puddle of molten metal resides at or below the crucible entrance point 10e. In an embodiment, an optical system may monitor the puddle height and accordingly, the controller 20 may control the wire feed system 1702 to feed wire 1701 into the system to maintain a prescribed reservoir of molten metal 10c. One of the useful elements in the system may be a discontinuous material gap 10f between the feed wire 1701 and the crucible 10a. The air space or discontinuous material gap 10f may prevent the heat transfer from the molten material 10c up the feed wire 1701. In this embodiment, a substantially anoxic environment may encase and protects the molten metal 10c at the opening (entrance point) 10e of the crucible 10a. When the molten fluid 10c is detected to be at the lower than desired, the driving feed wheels 40 may advance the feed wire 1701 such that the tip of the wire 1701 touches and optionally enters the puddle at the top 10e of the molten metal 10c crucible 10a. Heat transfer up the wire 1701 accordingly causes the wire 1701 to melt. The attractive forces from the molten feed metal 10c in the crucible 10a may cause the newly molten part of the wire 1701 to be pulled into the crucible 10a.

In one embodiment, the control system 20 of the feed wire 1701 is designed to dip the feed wire 1701 into the crucible 10a to control and promote the feeding of the material 1701 (10b) into the crucible. Another aspect of the embodiment is to orient the feed wire 1701 in a substantially vertical manner such that gravity aids in the dropping of the molten feed wire 1701 into the crucible 10a (along with surface tension and other attractive forces). Although the jetting or metal jetting nozzle/orifice 10 not shown in FIGS. 18-20, the crucible 10a shown provides molten metal 10c to the metal jet 10.

In one embodiment, as shown in FIG. 18, the opening 10e of the crucible 10a is ceramic, and the molten puddle fills the crucible 10a up to the top, such that a molten puddle of metal is easily visible. The puddle opening size may be small (0.1 mm-3 mm), or may be much larger. In a preferred embodiment, a 1 mm feed wire is used to replenish the molten material 10c in the crucible 10a through a 4 mm sized hole.

In one embodiment, as shown in FIG. 19, the fullness of the material 10c is monitored by the shape of the puddle at the top of the crucible hole. A convex shape may indicate that the fluid level is full. A flat shape may be neutral. And a concave shape may be a low fluid level. In one such control system controlled by the controller 20 connected to a sensor monitoring the shape or position of the puddle top (optical, visual, laser, conductive, thermal) and the drive 40, when the fluid level is drained such that the puddle becomes concave, the feed wire 1701 is advanced into the puddle to add material and refill the crucible 10a. A stepwise advance system may be employed (like a bang-bang controller 20).

In another embodiment, as shown in FIG. 19, the molten fluid level of the crucible 10a is determined by measuring the temperature of two thermocouples 10h, 10g at differential height levels in the crucible. In one version of the control system, the feed wire 1701 is advanced until the High Thermocouple 10*h* (High Tc) is sufficiently heated by the molten metal to indicate the fluid level is sufficiently high. As the fluid is consumed through the printing process, the High Thermocouple 10*h* Tc temperature will reduce. A plurality of control schemes could be used by the controller 20, from PID to bang-bang control depending on the print head 10 design, and print speed.

In another embodiment as shown in FIG. 20, the crucible 10*a* is refilled-by a feed wire 1701 contained in a tube-like structure 1702 that isolates the crucible 10*a* from the feed wire with a sharp thermal break or transition 10*j* (i.e., a zone of high thermal gradient in the direction of feeding creating a relatively rapid transition between molten and solid states, e.g., a 100 degrees C. in 1 cm or higher gradient). One such material for the thermal break 10*j* would be ceramic. This would be employed for high-temperature metals. A low-temperature thermal break 10*j* may be made out of stainless steel, which would be sufficient for metals such as aluminum. In this embodiment, the feed wire 1701 is driven by the feed wheels 40 at a constant torque (as supplied from a servo motor or the like) such that the pressure in the crucible 10*a* is maintained at a near constant value. In this embodiment, the constant driving pressure on the feed wheels 40 serves to automatically advance the feed material 1701 as needed into the crucible 10*a*. The sharp thermal break 10*j* minimizes the heat transfer up the feed material 1701, and serves to decouple the temperature of the crucible 10*a* from the upstream feed material 1701. In one such embodiment, the feed material 1701 is thin gauge stainless steel (wire diameter 0.020 mm-0.3 mm) which has commensurately small heat transfer upstream owed to the relatively small diameter, and relatively low coefficient of heat transfer (CTE).

The sharp thermal gradient of the system may be further enhanced by cooling fluid, such as inert gas purge, that is optimally introduced near the heat break 10*j*, and flows upward through the wire guide tube 1702, cooling the feed wire 1701. A plurality of locations for the inert gas purge may be used, such that the cooling gas can both shield the molten metal at the top of the crucible 10*a*, and cool the incoming feed wire 1701. The inert gas purge may further serve as a pressurizing agent for the crucible 10*a*. An optional gas-tight seal 1703 can be positioned in the feed tube 1702 that creates a seal between the feed tube wall, and a diameter controlled incoming feed wire 1701. The seal 1703 may be also used to maintain pressure, while a diverter valve is used to flow a portion of air upstream to cool the incoming feed wire 1701. Using a valve to control the pressure in this way would help maintain constant pressure in the crucible 10*a*, while making use of the bleed purge air to flow up the wire guide 1702 and cool the incoming feed wire 1701. Alternatively, a tightly fitting (slip fit) and heat conductive collet may be used to locate and heat sink the material.

In the present disclosure, "3D printer" is inclusive of both discrete printers and/or toolhead accessories to manufacturing machinery which carry out an additive manufacturing sub-process within a larger process. A 3D printer is controlled by a motion controller 20 which interprets dedicated G-code and drives various actuators of the 3D printer in accordance with the G-code.

"Fill material" includes material that may be deposited in substantially homogenous form as extrudate, fluid, or powder material, and is solidified, e.g., by hardening, crystallizing, or curing. "Substantially homogenous" includes powders, fluids, blends, dispersions, colloids, suspensions and mixtures.

"Filament" generally may refer to the entire cross-sectional area of an (e.g., spooled) build material.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A three-dimensional printer for additive manufacturing, comprising:
   a material feed path configured to receive a wire of metal material;
   a print head housing a nozzle and a melt reservoir, the melt reservoir in fluid communication with the nozzle and configured to receive the wire of metal material and melt the metal material to molten metal;
   a build plate opposing the print head;
   a plurality of actuators configured to move the print head relative to the opposing build plate in at least three degrees of freedom;
   a kinetic driver configured to maintain pressure in the melt reservoir at a predetermined pressure insufficient to eject droplets and to generate a pressure oscillation in the melt reservoir to force jetting of the molten metal through the nozzle and forming of molten metal droplets by surface tension at the nozzle;
   a normalizing grinding wheel connected to the print head; and
   a controller operatively connected to the kinetic driver, the print head, the build plate, and the plurality of actuators, the controller configured to:
      operate the print head and the kinetic driver to form successive layers of solidified metal by accumulation of the molten metal droplets impacting a previously deposited layer of solidified metal and cooling thereon, and
      drive at least one of the print head and the build plate to move such that the normalizing grinding wheel traverses each successive layer to level each successive layer.

2. The three-dimensional printer according to claim 1, wherein the normalizing grinding wheel is configured to traverse each successive layer with its rotating axis entirely within a plane parallel to a plane in which a layer is formed.

3. The three-dimensional printer according to claim 1, wherein the normalizing grinding wheel is further configured to remove sufficient material to shave both peaks and valleys in an irregular surface.

4. The three-dimensional printer according to claim 1, wherein the controller is further configured to drive the at least one of the print head and the build plate to move such that the normalizing grinding wheel removes 10-80% of the deposited solidified metal height.

5. The three-dimensional printer according to claim 1, wherein the controller is further configured to drive the at least one of the print head and the build plate to move such that the normalizing grinding wheel traverses over an area of no more than 125% of the area of the previously deposited solidified metal layer.

6. The three-dimensional printer according to claim 1, further comprising one of an inert gas supply and an inert gas generator configured to supply an inert gas.

7. The three-dimensional printer according to claim 6, wherein the inert gas supply is shared among at least two of the following:
  a. an inert gas feed to maintain an oxidation-free environment in the melt reservoir,
  b. an inert gas feed to maintain an oxidation-free environment in a print chamber, and
  c. an inert gas feed to maintain an oxidation-free environment between the nozzle and the build plate and about the molten droplets as they are jetted.

8. The three-dimensional printer according to claim 1, further comprising:
  an inspection system configured to inspect the successive layers of solidified metal, wherein the controller is further configured to adjust the driving of the at least one of the print head and the build plate based on the inspection of the inspection system.

9. A three-dimensional printer for additive manufacturing, comprising:
  a material feed path configured to receive a wire of metal material;
  a print head housing a nozzle and a melt reservoir, the melt reservoir in fluid communication with the nozzle and configured to receive the wire of metal material and melt the metal material to molten metal;
  a chamber including a build plate opposing the print head;
  a plurality of actuators configured to move the print head relative to the opposing build plate in at least three degrees of freedom;
  a kinetic driver configured to maintain pressure in the melt reservoir at a predetermined pressure insufficient to eject droplets and generate a pressure oscillation in the melt reservoir to force jetting of the molten metal through the nozzle and forming molten metal droplets by surface tension at the nozzle;
  a controller operatively connected to the kinetic driver, the print head, the build plate, and the plurality of actuators, the controller configured to operate the print head and the kinetic driver to form, in the chamber, a part with successive layers of solidified metal by accumulation of the molten metal droplets impacting a previously deposited layer of solidified metal and cooling thereon; and
  an optical inspection system configured to inspect the successive layers of solidified metal, wherein the controller is further configured to operate the kinetic driver to adjust the pressure oscillation in the melt reservoir based on the inspection of the optical inspection system.

10. The three-dimensional printer according to claim 9, wherein the print head is configured to:
  receive inert gas;
  receive a cleaning material;
  heat the cleaning material to activate the cleaning material; and
  remove, through the nozzle, metal from the print head.

11. The three-dimensional printer according to claim 10, wherein the nozzle is configured to receive the cleaning material, the metal, and the inert gas.

12. The three-dimensional printer according to claim 9, wherein the chamber includes a lockable sealed door.

13. The three-dimensional printer according to claim 12, further comprising:
  a purging system configured, in response to the sealed door being locked and before removal of the part from the chamber, to purge the melt reservoir by at least one of removing oxygen from the melt reservoir and flowing inert gas into the melt reservoir.

14. The three-dimensional printer according to claim 12, further comprising:
  a purging system configured, in response to the sealed door being locked and before forming the part, to purge the chamber by at least one of removing oxygen from the chamber and flowing inert gas into the chamber.

15. The three-dimensional printer according to claim 12, further comprising:
  a purging system configured, in response to the sealed door being locked and before forming the part, to purge the melt reservoir by at least one of removing oxygen from the melt reservoir and flowing inert gas into the melt reservoir.

16. The three-dimensional printer according to claim 12, further comprising:
  a purging system configured, in response to the sealed door being locked and before forming the part, to purge the melt reservoir by flowing anoxic gas through the melt reservoir in a gaseous volume in excess of a melt reservoir volume.

17. A three-dimensional printer for additive manufacturing, comprising:
  a material feed path configured to receive a wire of metal material;
  a print head housing a nozzle and a melt reservoir, the melt reservoir in fluid communication with the nozzle and configured to receive the wire of metal material and melt the metal material to molten metal;
  a build plate opposing the print head;
  a plurality of actuators configured to move the print head relative to the opposing build plate in at least three degrees of freedom;
  a kinetic driver configured to maintain pressure in the melt reservoir at a predetermined pressure insufficient to eject droplets and generate a pressure oscillation in the melt reservoir to force jetting of the molten metal through the nozzle and forming molten metal droplets by surface tension at the nozzle;
  a leveling system connected to the print head; and
  a controller operatively connected to the kinetic driver, the print head, the build plate, and the plurality of actuators, the controller configured to:
    operate the print head and the kinetic driver to form successive layers of solidified metal by accumulation of the molten metal droplets impacting a previously deposited layer of solidified metal and cooling thereon, and
    drive at least one of the print head and the build plate to move such that the leveling system traverses each successive layer to level each successive layer.

18. The three-dimensional printer according to claim 17, wherein the leveling system includes a laser ablation system.

19. The three-dimensional printer according to claim 17, wherein the leveling system includes an electron beam ablation system.

20. The three-dimensional printer according to claim 17, wherein the leveling system includes a rotating end mill.

21. The three-dimensional printer according to claim 17, wherein the leveling system is configured to remove sufficient material to remove both peaks and valleys in an irregular surface of each successive layer.

22. The three-dimensional printer according to claim 17, wherein the controller is further configured to drive the at least one of the print head and the build plate to move such that the leveling system removes 10-80% of the deposited solidified metal height.

23. The three-dimensional printer according to claim 17, wherein the controller is further configured to drive the at least one of the print head and the build plate to move such that the leveling system traverses over an area of no more than 125% of the area of the previously deposited solidified metal layer.

24. The three-dimensional printer according to claim 17, further comprising one of an inert gas supply and an inert gas generator configured to supply an inert gas.

25. The three-dimensional printer according to claim 24, wherein the supply of inert gas is shared among at least two of the following:
   a. an oxidation-free environment in the melt reservoir,
   b. an inert gas feed to maintain an oxidation-free environment in a print chamber, and
   c. an inert gas feed to maintain an oxidation-free environment between the nozzle and the build plate and about the molten droplets as they are jetted.

26. The three-dimensional printer according to claim 17, further comprising:
   an inspection system configured to inspect the successive layers of solidified metal,
   wherein the controller is further configured to adjust the driving of the at least one of the print head and the build plate based on the inspection of the inspection system.

27. A three-dimensional printer for additive manufacturing, comprising:
   a material feed path configured to receive a wire of metal material;
   a print head housing a nozzle and a melt reservoir, the melt reservoir in fluid communication with the nozzle and configured to receive the wire of metal material and melt the metal material to molten metal;
   a build plate opposing the print head;
   a chamber including a build plate opposing the print head;
   a plurality of actuators configured to move the print head relative to the opposing build plate in at least three degrees of freedom;
   a kinetic driver configured to maintain pressure in the melt reservoir at a predetermined pressure insufficient to eject droplets and to generate a pressure oscillation in the melt reservoir to force jetting of the molten metal through the nozzle and forming molten metal droplets by surface tension at the nozzle;
   a controller operatively connected to the kinetic driver and the print head, the controller configured to operate the print head and the kinetic driver to form, in the chamber, a part with successive layers of solidified metal by accumulation of the molten metal droplets impacting a previously deposited layer of solidified metal and cooling thereon; and
   a feedback control system configured to monitor behavior of the molten metal in the melt reservoir,
   wherein the controller is further configured to operate the kinetic driver to adjust the pressure oscillation in the melt reservoir based on the behavior of the molten metal in the melt reservoir monitored by the feedback control system.

28. The three-dimensional printer according to claim 27, wherein the kinetic driver includes a magnetohydrodynamic kinetic driver configured to convert modulated current into pressure pulses in the melt reservoir.

29. The three-dimensional printer according to claim 27, wherein the kinetic driver includes a vibrating plunger configured to cause vibration in the melt reservoir.

30. The three-dimensional printer according to claim 27, wherein the kinetic driver includes a piezoelectric transducer configured to oscillate in the melt reservoir.

31. The three-dimensional printer according to claim 27, wherein the kinetic driver includes a plurality of electrodes configured to generate a pressure wave in the molten metal.

32. The three-dimensional printer according to claim 31, wherein in monitoring the behavior of the molten metal in the melt reservoir, the feedback control system is further configured to monitor current in the plurality of electrodes due to a residual pressure wave in the molten metal in the melt reservoir and provide a signal to the controller based on the monitored current.

33. The three-dimensional printer according to claim 27, wherein in monitoring the behavior of the molten metal in the melt reservoir, the feedback control system is further configured to monitor a residual pressure wave in the molten metal in the melt reservoir and provide a signal to the controller based on the residual pressure wave.

34. The three-dimensional printer according to claim 27, wherein in monitoring the behavior of the molten metal in the melt reservoir, the feedback control system is further configured to monitor acoustic behavior of the molten metal in the melt reservoir and provide a signal to the controller based on the acoustic behavior.

* * * * *